United States Patent [19]

Taylor

[11] Patent Number: 4,635,544
[45] Date of Patent: Jan. 13, 1987

[54] MODULE BUILDER WITH A FLARED TOP AND WITH ATTACHMENTS

[76] Inventor: Clyde L. Taylor, 1545 Chinowth, Visalia, Calif. 93277

[21] Appl. No.: 540,404

[22] Filed: Dec. 14, 1983

Related U.S. Application Data

[63] Continuation-in-part of Ser. No. 288,647, Jul. 30, 1981, abandoned.

[51] Int. Cl.⁴ ............................................. B30B 9/30
[52] U.S. Cl. .................................. 100/98 R; 100/100; 100/218; 100/226; 100/255; 100/295; 414/528
[58] Field of Search ............. 100/100, 218, 226, 98 R, 100/255, 295, 240; 414/528; 56/344, 345, 346

[56] References Cited

U.S. PATENT DOCUMENTS

| | | | |
|---|---|---|---|
| 315,960 | 4/1885 | Piatt | 100/98 R |
| 1,469,511 | 10/1923 | Huebner | 100/295 X |
| 2,674,535 | 4/1954 | Meisler | 100/295 X |
| 2,884,694 | 5/1959 | Hannon et al. | 100/98 R X |
| 3,051,076 | 8/1962 | West | 100/295 X |
| 3,896,720 | 7/1975 | Rhodes | 100/226 |
| 4,184,425 | 1/1980 | Haney | 100/100 |
| 4,241,653 | 12/1980 | Fagundes | 100/226 |

Primary Examiner—Billy J. Wilhite
Attorney, Agent, or Firm—Flehr, Hohbach, Test, Albritton & Herbert

[57] ABSTRACT

Module builder having a generally rectangular framework with an open top side and with spaced apart side walls and spaced apart front and rear walls. The rear wall is formed by a door movable between open and closed positions. A carriage is mounted on the framework for movement longitudinally of the framework between the front and rear walls. A motor is provided for causing movement of said carriage between the front and rear walls. A tramper mechanism is carried by the carriage and has a tramper foot. A hydraulic actuator is provided for moving said tramper foot vertically within said framework for forming a module of material which is dumped into the framework. Wheels are mounted on opposite sides of said framework to permit the module builder to be transported from one location to another. The side walls have upwardly and outwardly flared portions so that imaginery vertical lines depending from the outer upper margins of the side walls clear the wheels on the sides of the rectangular framework.

23 Claims, 13 Drawing Figures

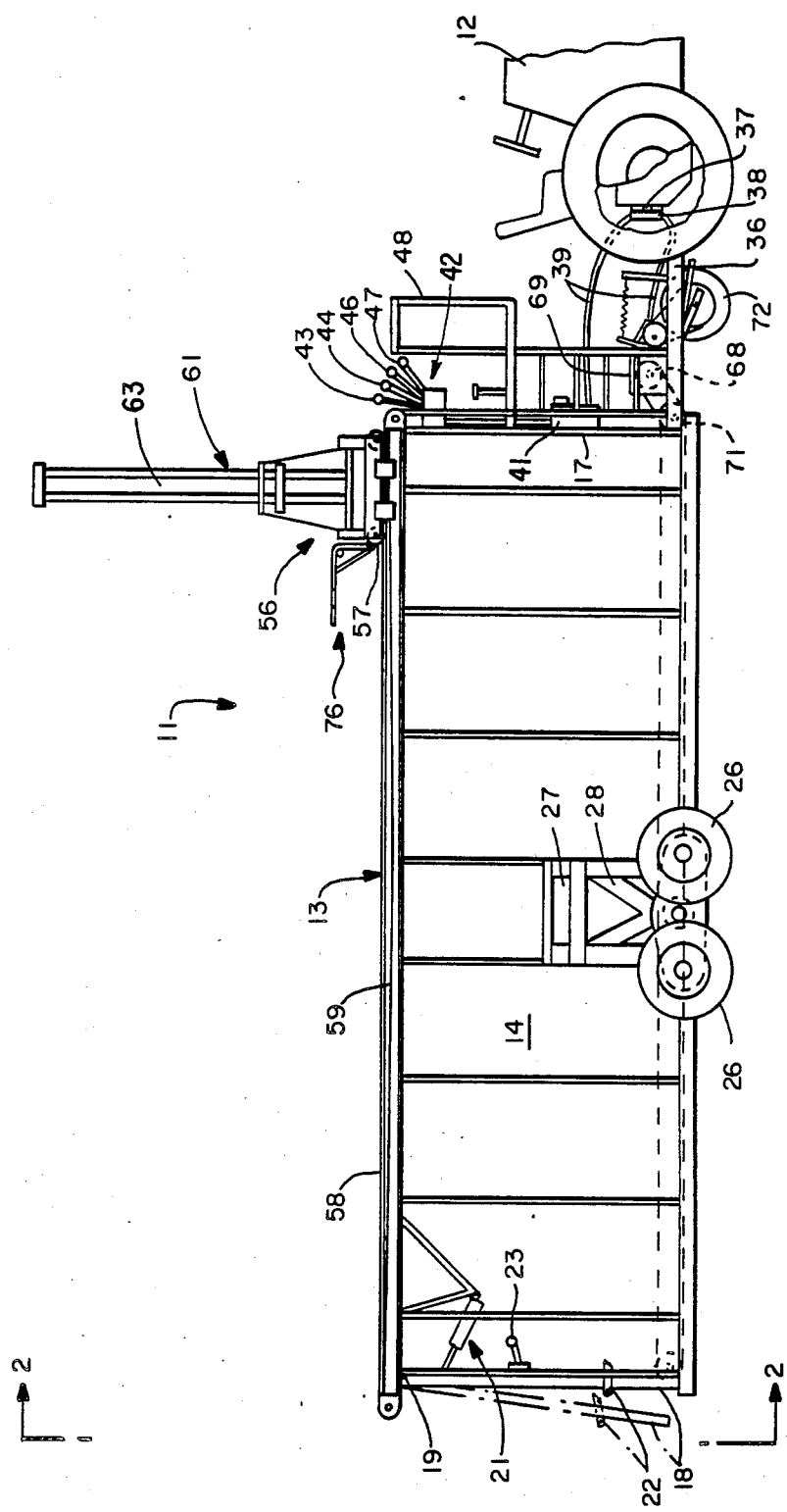

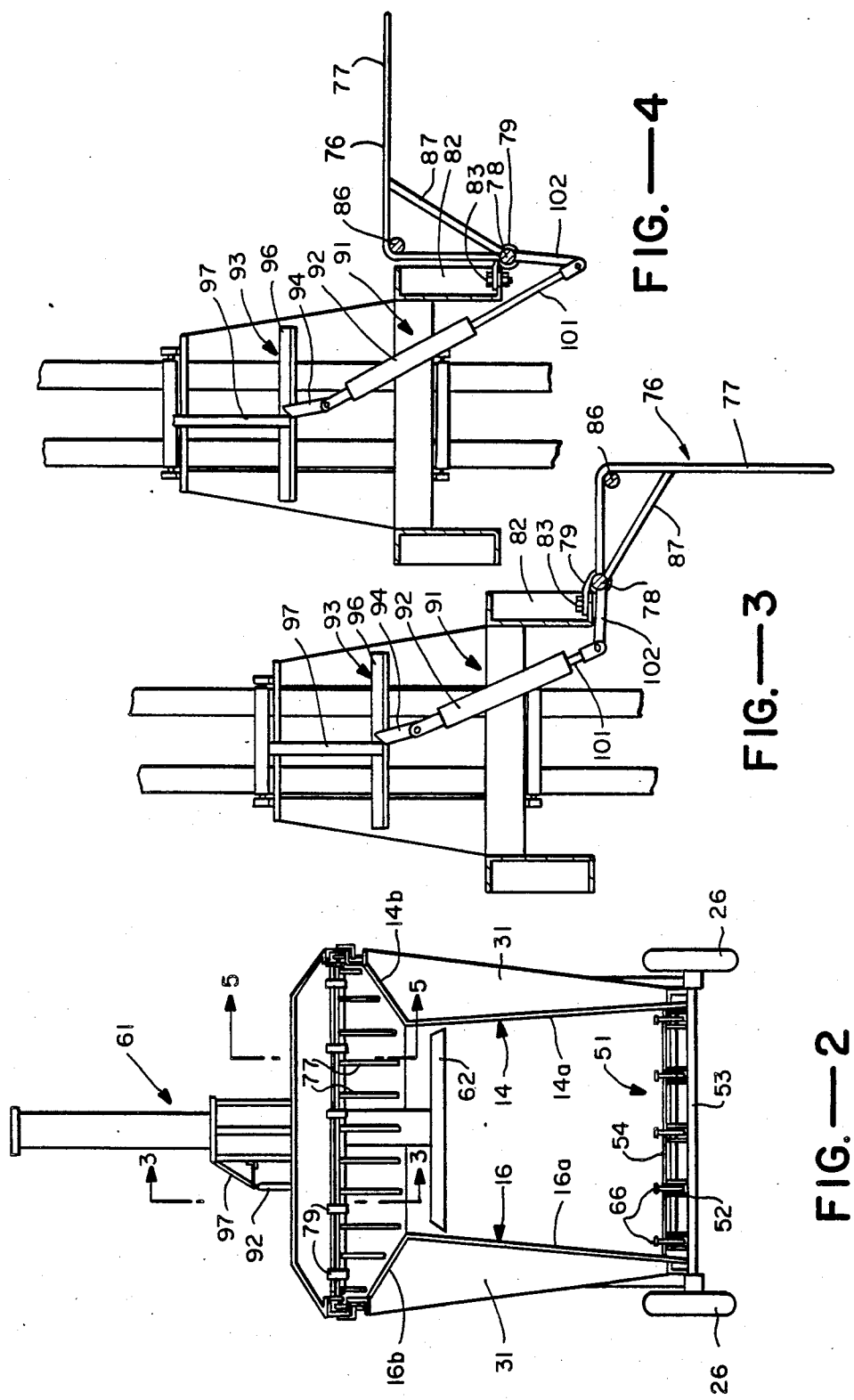

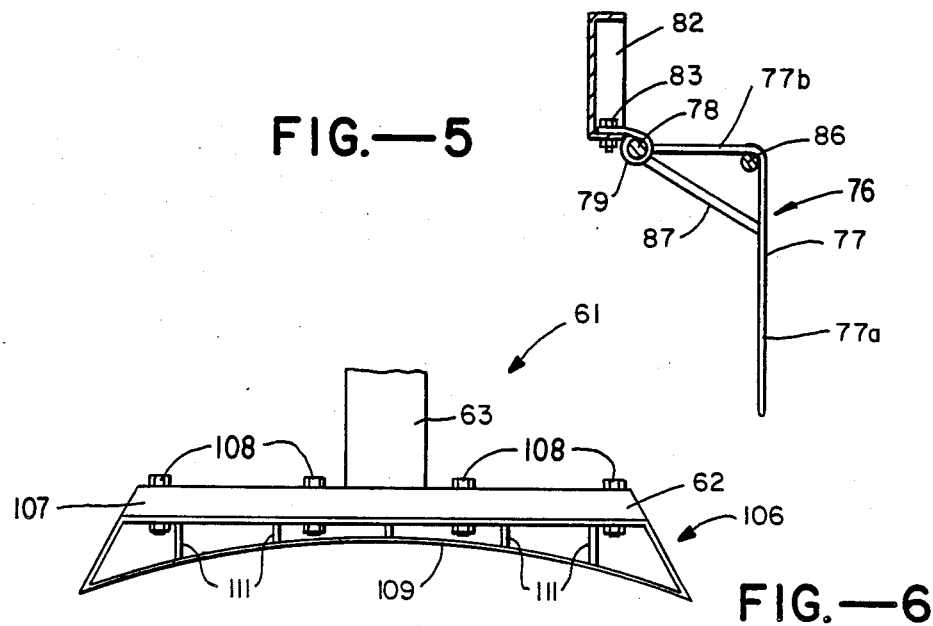
FIG.—5
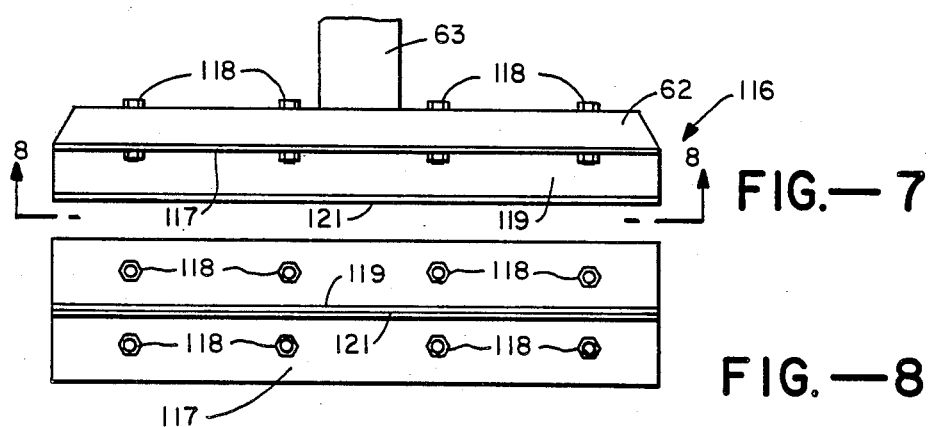
FIG.—6
FIG.—7
FIG.—8
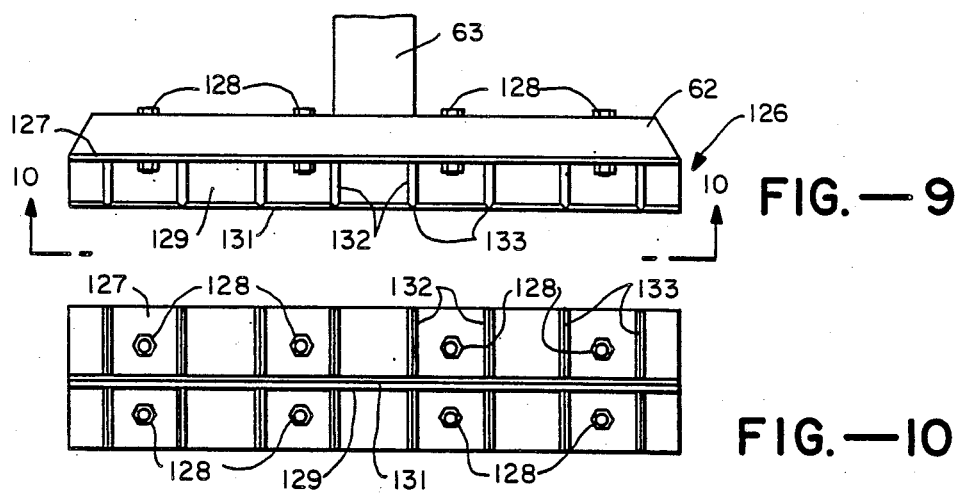
FIG.—9
FIG.—10

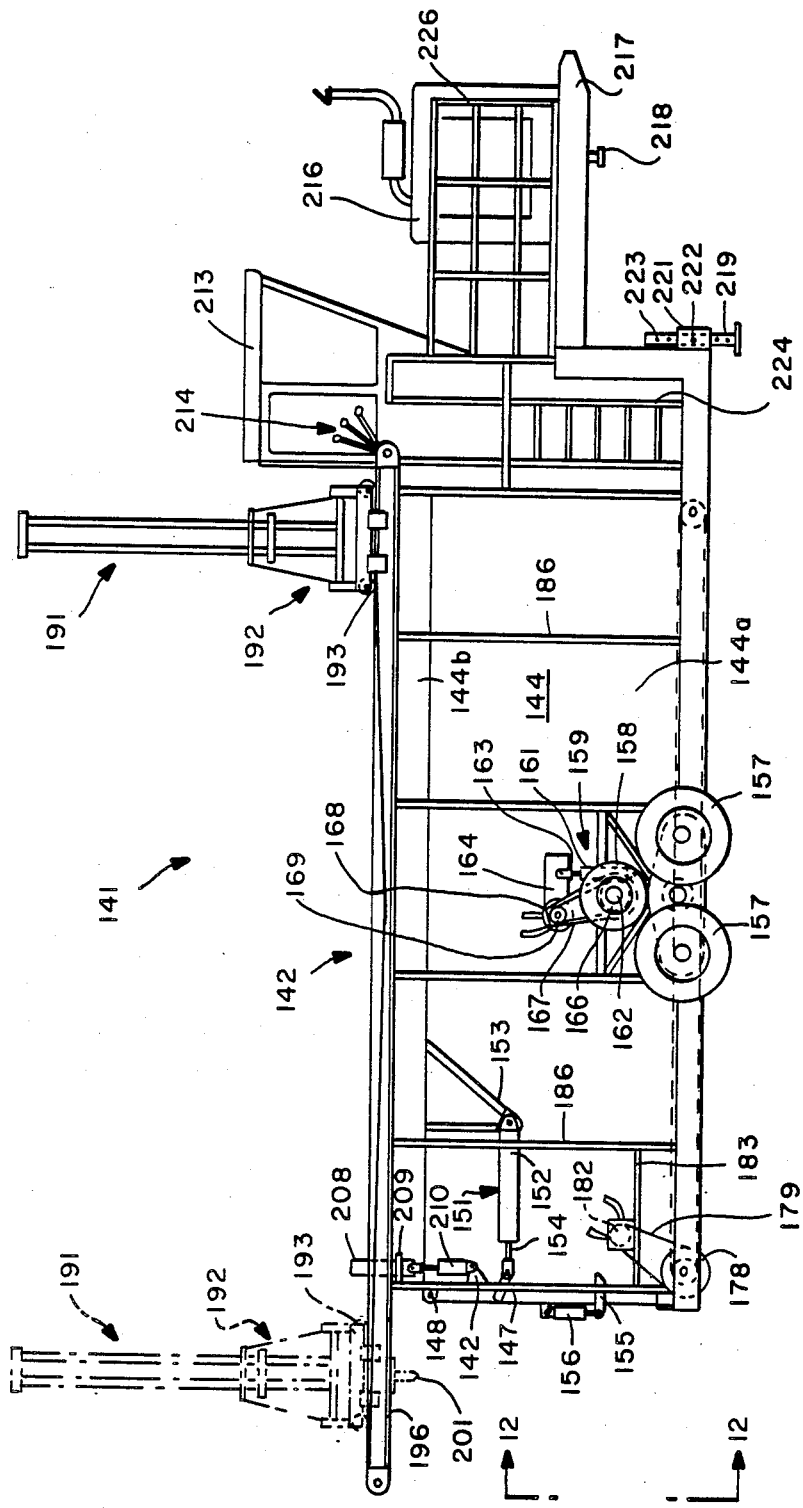

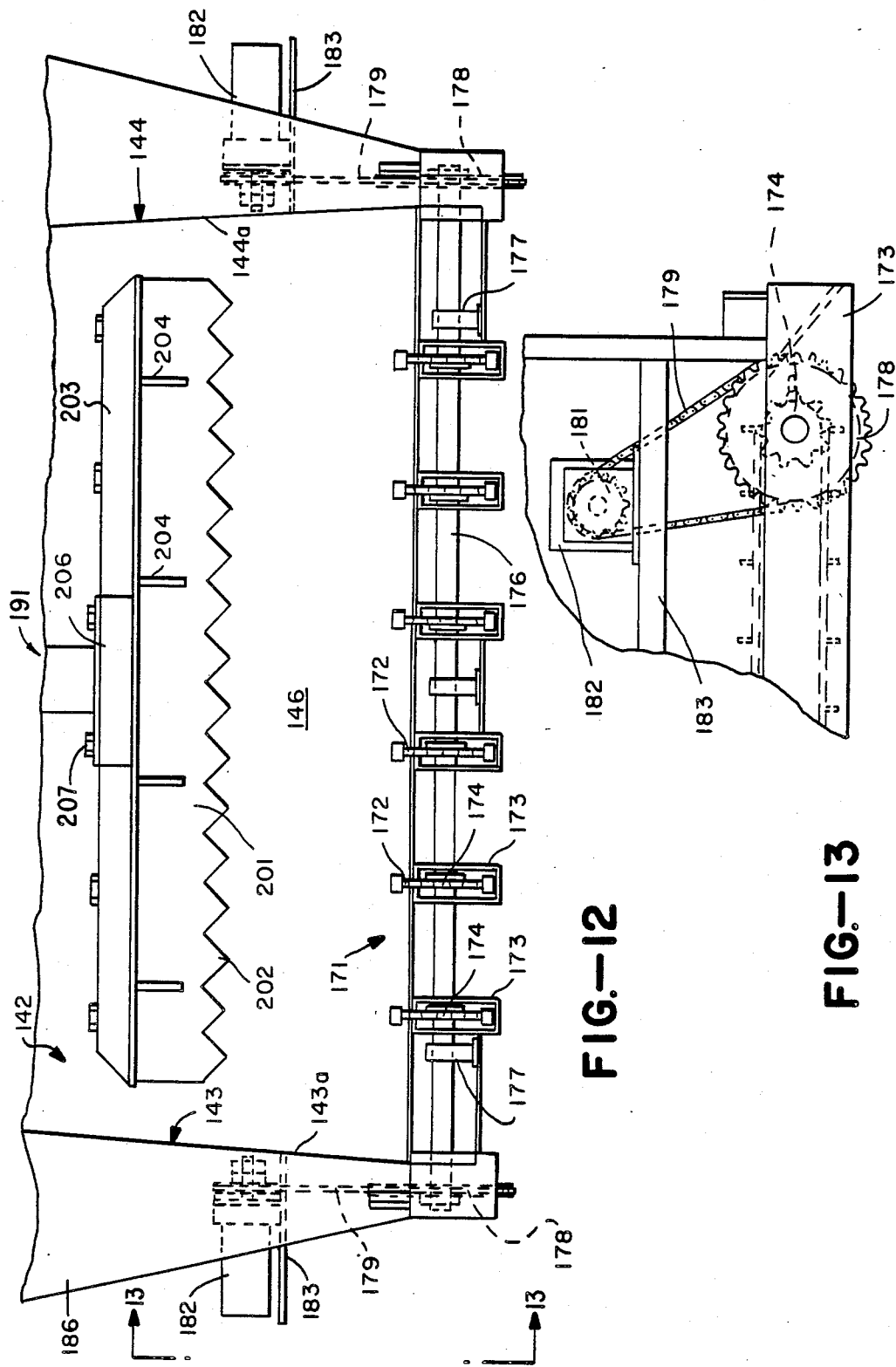

MODULE BUILDER WITH A FLARED TOP AND WITH ATTACHMENTS

This application is a continuation-in-part of application Ser. No. 288,647 filed on July 30, 1981 now abandoned.

This invention relates generally to a module builder and more particularly to a module builder with a widely flared top with attachments.

Module builders have heretofore been provided such as disclosed in U.S. Pat. No. 4,241,653. However, with module builders of this type certain features have been found to be missing. For example it has been found with the last couple of dumps of seed cotton into the module builder, the seed cotton has a tendency to spill on the ground because of the restricted hopper area underlying the basket of the cotton picker as the basket is dumped. Also because the upper extremity of the module builder is relatively narrow, there is a great likelihood that the cotton picker can bump into the wheels of the module builder. In addition with such a module builder, there has been difficulty encountered in placing the last few dumps of cotton into the module builder because the carriage for the tramper would run into a dump of cotton which would stop the advance of the carriage longitudinally of the module builder. This often necessitated a person entering the module builder and distributing the cotton by hand in order to make it possible for the carriage assembly to move over the dump of cotton. In addition in connection with module builders it has been difficult to provide tops on the modules built by the module builder to facilitate the shedding of water by the modules built by the module builders. There is therefore a need for a new and improved module builder which will overcome these disadvantages.

In general it is the object of the present invention to provide a module builder which has a widely flared top to reduce spillage as the module builder is loaded.

Another object of the invention is to provide a module builder which has a capability of raking material that has been loaded into the module builder particularly with respect to material which has been dumped into the module builder when the module builder is nearly filled.

Another object of the invention is to provide a module builder which has the capability for shaping the top of the module so as to facilitate the shedding of rain by the module.

Another object of the invention is to provide a module builder which has the capability of compacting branches of like material into modules.

Another object of the invention is to provide a module builder of the above character in which the tramper is provided with a capability for cutting the branches and other material in the module builder to facilitate compacting of the branches.

Additional objects and features of the invention will appear from the following description in which the preferred embodiments set forth in conjunction with the accompanying drawings.

FIG. 1 is a side elevational view of a module builder incorporating the present invention.

FIG. 2 is a cross-sectional view of the module builder shown in FIG. 1.

FIG. 3 is a cross-sectional view taken along the line 3—3 of FIG. 2 showing the rake attachment in a material engaging position.

FIG. 4 is a view similar to FIG. 3 but showing the rake attachment moved to an out-of-the-way position.

FIG. 5 is an enlarged cross-sectional view taken along the line 5—5 of FIG. 2.

FIG. 6 is a side elevational view of another attachment for the module builder for use in forming rounded tops on the module.

FIG. 7 is a front elevational view of still another attachment for the module builder for use in cutting branches and twigs to facilitate compaction of the branches and twigs.

FIG. 8 is a bottom plan view of the attachment shown in FIG. 7 looking along the line 8—8 of FIG. 7.

FIG. 9 is a front elevational view of another attachment for the module builder for use in cutting up material to facilitate compaction.

FIG. 10 is a bottom plan view of the attachment shown in FIG. 9 looking along the line 10—10 of FIG. 9.

FIG. 11 is a side elevational view of still another embodiment of a module builder incorporating the present invention and particularly adapted for compacting brush.

FIG. 12 is a view looking along the lines 12—12 of FIG. 11.

FIG. 13 is an enlarged view taken along the line 13—13 of FIG. 12.

In general, the module builder consists of a generally rectangular framework having an open top side and having spaced apart side walls and spaced apart front and rear walls. The rear wall is formed by a door movable between open and closed positions. A carriage is mounted on the framework for movement longitudinally of the framework between the front and rear walls. Means is carried by the framework for causing movement of the carriage between the front and rear walls. A tramper mechanism is carried by the carriage and has a tramper mechanism carrying a tramper foot. Means is provided for moving the tramper foot vertically within the framework for forming a module within the framework. Various attachments are provided to facilitate the forming of modules by the module maker which include a rake attachment for leveling piles of material within the module builder as well as an attachment for shaping the top of the module being built in the module builder. Other attachments are provided to facilitate the cutting of branches and twigs and the like and for compacting them into modules.

More particularly as shown in FIGS. 1-5 of the drawings the module builder 11 is adapted to be pulled by a self propelled vehicle in the form of a wheeled tractor 12. The module builder consists of a rectangular framework 13 having spaced apart side walls 14 and 16 and spaced apart front an rear walls 17 and 18. The side walls 14 and 16 are provided with planar tapered portions 14a and 16a which are inclined downwardly and outwardly and top flared portions 14b and 16b which are inclined upwardly and outwardly. The side walls 12 and 13 are also tapered outwardly to the rear as for example four inches in sixteen feet. The front wall 17 is generally vertical as shown. The rear wall 18 is formed by a door which is movable between open and closed positions. The door is hinged at 19 for pivotal movement about a horizontal axis which is generally coincident with the top rear extremity of the generally rectangular framework 13. The mechanism which is utilized for moving the door 18 between an open position which is substantially horizontal with the top of the framework 13 and a closed position which consists of hydraulic actuators 21 of the type described in U.S. Pat. No. 4,241,653. A latching mechanism 22 is provided for retaining the door in a closed position during the time that the modules is being formed as hereinafter described. The flow of hydraulic fluid to the hydraulic actuators is under the control of a control lever 23 mounted on the framework 13.

A pair of ground engaging wheels 26 is provided on each side of the generally rectangular framework 13 and is mounted in a fixed position with respect to the framework. Reinforcing members 27 and 28 are provided as a part of the framework and support the wheels 26 on the framework 13. As will be particularly noted in FIG. 2, vertically extending reinforcing gussets 31 are provided at spaced intervals on the exterior of the walls 14 and 16 for reinforcing the walls 14 and 16. The widely flared hopper provided by the upperwardly and outwardly inclined portions 14b and 16b of the side walls 14 and 16 of the rectangular framework is of a width so that a vertical line depending from the outer upper extremities of the side walls 14 and 16 will clear the wheels 26.

The ground engaging wheels 26 are provided for moving the module builder from one location to another. To facilitate such movement, the module builder is provided with a drawbar 36 which can be attached to the suitable motive means as for example the tractor 12. A power takeoff shaft 37 carried by the tractor drives a hydraulic pump 38 which is connected to hoses 39. The pump 38 and the hoses 39 form a part of a hydraulic system which is disclosed in U.S. Pat. No. 4,241,653. The hydraulic system also includes a storage tank 41 and a control assembly 42 which includes hydraulic control levers 43, 44, 46 and 47. An operator's platform 48 is mounted on the exterior surface of the front wall 17 of the rectangular framework 13 and gives the operator ready access to the control levers 43, 44, 46 and 47.

A bottom wall structure 51 of the type described in U.S. Pat. No. 4,241,653 is provided for closing the bottom of the rectangular framework 13 and consists of a plurality spaced apart parallel box beam members 52 which extend longitudinally of and are parallel to the side walls 14 and 16. The box beam members 52 are mounted on cross members 53 secured to the lower extremity of the rectangular framework 11. Plates 54 are mounted upon the box beam members 52 and form the upper surface for the bottom wall structure 51.

A carriage 56 is mounted upon the rectangular framework for movement longitudinally of the framework between the front and rear walls 17 and 18. The carriage 56 is of the type described in U.S. Pat. No. 4,241,653 and includes wheels 57 which travel on U-shaped channel members 58 secured to the top extremities of the side walls 12 and 13. Means is provided for causing movement of the carriage longitudinally of the framework and consists of chains 59 carried within channel members 58 and which are adapted to be driven by hydraulic motor (not shown) as described in U.S. Pat. No. 4,241,653.

A tramper mechanism 61 of a conventional type such as described in U.S. Pat. No. 4,241,653 is mounted upon the carriage 56. The trampe mechanism 61 includes a pair of spaced apart parallel tramper feet 62 which are disposed within the rectangular framework 11 and which extend traversely between the side walls 14 and 16 of the framework 13. The tramper feet 62 are movable between raised and lowered positions in the framework 13. The tramper feet 62 are movable between raised and lowered positions in the framework 11 by a hydraulic ram 63 under the control fo the control lever 43 so that the operator of the module builder can control the raising and lowering the the hydraulic ram 63 while controlling the traversing movement of the carriage 56.

As described in U.S. Pat. No. 4,241,653 modules can be formed within the rectangular framework 13 upon the bottom wall structure 51. Means is provided within the framework 13 for discharging from the module builder any module which has been formed in the framework 13. Such means consists of a plurality of endless chains 66, the lower runs of which travel within the box beam members 52 and the upper runs of which travel over the top surface of the plates 54 carried by the box beam members 52. Means is provided for driving endless chains as described in U.S. Pat. No. 4,241,653 and includes the hydraulic motor 68 which drives a gear box 69. The gear box 69 drives sprockets 71 which carry the chains 66. A wheel 72 which is adapted to engage the ground and which is connected to circuitry of the type described in U.S. Pat. No. 4,241,653 controls the movement of the chains 66 so that they move in synchronism with the forward movement of the module builder 11.

The portions of the module builder thus far described are conventional except for the large outwardly flared hopper which is provided as a part of the rectangular framework 13. In addition to being provided with a large flared hopper, the module builder 11 shown in FIGS. 1-5 includes a rake attachment 76. The rake attachment 76 consists of a plurality of spaced apart parallel L-shaped rake teeth 77 which are secured to a cylindrical member 78 in the form of a heavy wall pipe. By way of example, the rake teeth 77 can have dimensions in which they are sixteen inches in length along one leg portion 77a and ten inches in length along the other leg portion 77b. The teeth 77 can be secured to the cylinder 78 by suitable means such as welding.

Means is provided for rotatably mounting the cylinder 78 on which the rake teeth 77 are mounted and consists of a plurality of spaced apart sleeves 79 formed of a suitable material such as steel which are rolled over the cylinder 78 and which have one extremity of the same secured to the lower flange of a channel member 82 (see FIG. 3) by suitable means such as bolts 83. A reinforcing rod 86 extends across the teeth 77 and is secured by suitable means such as welding at the points of the teeth where they make a right angle bend between the portions 77a and 77b as shown particularly in FIGS. 3 and 4. Additional reinforcing means is provided in the form of a plurality of braces 87 in which a brace 87 is provided for each of the teeth 77.

Means is provided for moving the rake attachment between a raking of material-engaging position shown in FIG. 3 and an out-of-the-way position and consists of a hydraulic actuator 91 which has a cylinder 92 pivotally connected to a bracket structure 93 secured to an upper portion of the carriage 56. The bracket structure 93 includes an outwardly extending generally L-shaped arm 94 which is mounted upon an angle member 96. The angle member 96 is supported by a brace 97 secured to the upper extremity of the carriage 56. The piston rod 101 of the hydraulic actuator is pivotally connected to an arm 102 which is secured to the cylinder 78. Thus it can be seen that when the piston rod 101 is in its fully retracted position, the rake teeth 77 are depending downwardly in their fully extended position. Conversely when the piston rod 101 is extended, the teeth 77 are moved to n out-of-the-way position in which they are substantially horizontal as shown particularly in FIG. 4.

Operation of the rake attachment in connection with the module builder may now be briefly described as follows. Let it be assumed that is its desired to utilize the module builder for making cotton modules. As explained in U.S. Pat. No. 4,241,653, the module builder can be moved into the field to meet the cotton picker when the basket carried by the cotton picker has been filled. The cotton picker and the module builder are moved into position with respect to each other so that the basket of the cotton picker extends over the flared top of the module builder at which time, the basket can be released to dump the cotton into the module builder. The inclined surface provided by the side wall has an inclination such that the seed cotton will readily drop into the rectangular framework 13. Very little if any cotton will drop to the ground because of the large flared top which is provided on the rectangular framework. The cotton picker can move into a position so that the basket of the cotton picker overlies the top side of the module builder without bumping into th wheels 26 of the module builder.

As soon as sufficient cotton has been dumped into the module builder, the seed cotton can be compacted within the module builder to begin the commencement of building of a module within the module builder. This can be accomplished by utilizing the tramper mechanism 61 carried by the carriage by moving the carriage 56 longitudinally of the framework and at the same time causing the tramper feet 62 to move up and down the compact the cotton within the module builder. At these initial stages, the cotton within the module builder can be redistributed by the use of the tramper feet 62. This same procedure is continued and additional seed cotton is dropped into the module builder from the cotton picker. During this filling of the module builder, it is possible to keep the tramper foot above the dumps of seed cotton into the module builder and to thereby permit the tramper foot to be utilized in distributing the cotton longitudinally of the rectangular framework 13. The last few dumps of cotton from the cotton per into the module builder will be at an elevation which is above the tramper foot and possibly of the lower extremity of the carriage so as to impede movement of the carriage. When it is appreciated that this is about to occur, the carriage is moved to the front of the cotton picker so that the dumps of cotton are to the rear of the carriage. After the cotton has been dumped, the carriage 56 is moved until it bumps into the cotton at which time, the hydrualic actuator 91 can be actuated by the operation of control lever 47 to cause the rake attachment to move the rake teeth 77 from a substantially horizontal position to a vertical position to take a ten inch by twenty inch bite out of the cotton pile for the width of the framework 13. The carriage 56 is then moved back towards the front to distribute the seed cotton in the framework 13. As soon as the seed cotton drops clear of the rake teeth 77, the hydraulic actuator 91 is operated to move the teeth 77 to an out-of-the-way position and the carriage 56 is advanced until it again strikes the pile of cotton. At this time another bite can be taken from the pile of cotton by operation of the hydraulic actuator 92. The carriage is again moved to thereon to redistribute the seed cotton until it falls clear of the teeth 77. This procedure is repeated until the seed cotton in the pile has been reduced to a level which is below the lower extremity of the teeth 77. At this time, the tramper 62 can be operated to further compact the cotton. The last dump for a module in the cotton module builder is dumped near the rear of the module builder. The same procedure is then repeated in which the rake teeth are utilized to redistribute the cotton to a level so that the tramper 62 can pass over the top of the same to compact the cotton into the framework 13.

As soon as the last dump of seed cotton into the module builder has been redistributed and tramped, the module builder may be moved to the desired position where it is desired to discharge the module which has been formed in themodule builder. The operator then operates the control lever 23 to open the rear door 18 to move it into a horizontal position. Thereafter, the hydraulic motor 68 can be operated to drive the chains to cause the module builder which has been formed within the module builder to be discharged through the rear of the module builder in the manner described in U.S. Pat. No. 4,241,653. After this has been accomplished, the rear door can be closed and the module builder can again meet the cotton picker to again start the building of another module. In this way it can be seen that it is possible to build full size modules within the module builder without the necessity of a man entering the module builder to level the cotton particularly with respect to the last few dumps of cotton which are placed in the module builder.

In FIG. 6, there is shown an attachment 106 for the module builder which can be utilized for forming a more rounded top on the module which is formed within the module builder to facilitate the shedding of rain by the module in the field after it has been removed from the module builder.

This attachment 106 consists of a flat plate 107 which is removably secured to the tramper feet 62 by a plurality of spaced bolts 108. A large plate 109 is carried by the plate 107 and is provided with a curvature which is generally concave extending in a direction along the length of the tramper feet 62 and of the width of the rectangular framework 13. The plate 109 is secured to the plate 107 by a plurality of spaced gussets 111 which are welded between the plates 107 and 109 to give the required rigidity to the plate 109 and also to retain the desired curvature in the plate 109.

It can be seen that with the use of such an attachment to the tramper feet 62 it is possible to provide a more rounded top on the module which is formed within the rectangular framework 13 by operation of the tramper mechanism 61 in compacting the seed cotton as it is dumped into the module builder. With the top of the module firmly compacted in a rounded contour, it can be seen that the compacted cotton will have a greater tendency to shed rain falling upon the cotton module to thereby prevent spoilage of the seed cotton during the time the cotton module is being held for ginning.

Another attachment 116 is shown in FIG. 7 which is particularly useful for cutting branches and twigs when they are to be formed into modules. This cutting attachment 116 consists of a flat plate 117 which is secured to the feet 62 by suitable means such as bolts 118. A knife blade 119 is secured to the plate 117 by a suitable means such as welding. The knife blade 119 extends the length of the plate 117 which is the length of the tramper feet 62 and extends substantially across the entire width of the rectangular framework 13. The knife blade 119 is provided with a cutting edge 121 which extends the length of the knife blade 119.

Use of the cutting attachment shown in 116 may now be described as follows. The attachment is particularly useful for moduling prunings of trees as for example fruit trees. Since these limbs and branches are green they are very springy. In addition, the fruit limbs are of a relatively hard wood which makes them difficult to form into modules when the prunings are dumped into the module builder. The use of the attachment 116 on the tramper foot makes it possible to cut up the branches and limbs in the module so that they can be more readily compacted. By way of example after the large bunch of prunings have been dumped into the module builder, the carriage 56 with the tramper mechanism thereon can be moved longitudinally of the rectangular framework and the tramper mechanism 61 operated to bring the tramper feet 62 down repeatedly on to the prunings within the rectangular framework. By way of example, the tramper mechanism could be moved for and aft six or eight inches at a time to cause the knife blade to cut and crush the prunings so that the twigs and branches will not spring back so as to provide a relatively compact module of the prunings.

By utilization of such an attachment, it has been found that relatively compact modules can be formed of the prunings. Because the module builder is provided with a bottom wall very high pressures can be applied to the prunings to make it possible to form more compact modules. After the module has been formed within the module builder of such prunings, the module can be discharged in the manner hereinbefore described.

The module builder can be of dimensions so that the modules formed in the module builder have a size so that the modules of prunings can be readily transported from the field to suitable locations where they can be used for fuel as for example for power plant boilers. By way of example, the modules can be formed so that it is possible to transport the same on a conventional flatbed truck having a flatbed which is eight feet wide and twenty four feet long. With such a flatbed, the modules can be formed so that they would be twelve feet long, eight feet wide and four feet high. Two of such modules could be placed end to end on each side of the flatbed for a total of four for the first layer and then an additional four could be placed in the top layer to make it possible for a conventional flatbed truck to transport eight of such modules to the desired location.

Another type of cutting attachment 126 is shown in FIGS. 9 and 10. It also consists of a flat plate 127 which is secured to the feet 62 by bolts 128. A knife blade 129 having a cutting edge 131 is secured to the plate 127 by suitable means such as welding and extends longitudinally of the plate and transversely of the rectangular framework 13. Additional knife blades 132 having cutting edges 133 are also secured to the plate 127 by suitable means such as welding and extend in a direction which is perpendicular to the knife blade 29 and longitudinally of the rectangular framework 13. The knife blades 132 as shown are spaced apart and parallel on opposite sides of the knife blade 129 to provide in effect a checkerboard patters as viewed in FIG. 10. The attachment 126 shown in FIGS. 9 and 10 can be utilized in connecting with the compacting of different types of material such as rice straw to form the same into modules. The knife blades 129 and 132 serve to cut up the material and at the same time compress the same into compact modules. The modules when compacted can be unloaded from the module builder in the same manner as hereinbefore described.

With respect to all the attachments herein described, it should be appreciated that although they have been disclosed for use in conjunction with a module builder having a bottom wall structure, they are also useful in module builders of the type which have an open bottom wall.

From the foregoing, it can be seen that the outwardly sloping side walls provide a much larger dumping area which serves to reduce spillage and also reduces the need to manuever equipment to avoid bumping the module maker wheels. By utilization of the bottom wall structure in connection with a greater force supplied by the tramper it is possible to provide higher density modules. The use of the rake attachment makes it possible to build the modules without the necessity of climbing down into the module builder particularly during the last few dumps into the module builder. By way of example, module builders built in accordance with such a construction have had a two feet greater width at the top and provided 64 square feet of larger dumping area than conventional module builders. It has been found that the larger hopper area for the module builder reduces spillage and wind loss. Even though a larger hopper area has been provided for dumping, the interior dimensions for the module are standard. In addition, a number of useful attachments have been provided which can be utilized for building modules of various types of materials. The attachments are the type which can be readily placed on the tramper feet or removed from the tramper feet.

Another embodiment of a module builder incorporating the present invention is shown in FIGS. 11 through 13. The module builder 141 shown therein consists of a rectangular framework 142 having spaced apart side walls 143 and 144 and spaced apart front and rear walls 146 and 147. As with the embodiment of the invention shown in FIGS. 1 and 2, the side walls 143 and 144 are tapered in the same manner as the side walls 14 and 16. Thus they are provided with lowered tapered portions 143a and 144a and upper tapered portions 143b and 144b. The rear wall is in the form of a door 147 which is movable between open and closed positions. The door 147 is hinged at 148 so that it can be swung upwardly into an out-of-the-way position.

Means is provided for moving the door 147 between the open and out-of-the-way position and a closed position and consists of a hydraulic actuator 151 which has its cylinder 152 pivotally connected to a V-shaped framework 153 mounted on the rectangular framework 142. The piston rod 154 of the hydraulic actuator 151 is pivotally connected to the door 147. It can be seen that as the hydraulic actuator 151 is operated the door 147 can be moved between open and closed positions. A latching mechanism 155 is provided for retaining the door 147 in a closed position and is movable between latching and unlatching positions by a hydraulic actuator 156.

First and second rubber tired ground engaging wheels 157 are provided on opposite sides of the framework 142 and are rotatably mounted in fixed positions with respect to the framework. Drive means is provided for driving the wheels 157 and consists of a rubber tired wheel 158 which is adapted to be moved into engagement with the rubber tired wheels 157. Means is provided for yieldably urging the wheel 158 into engagement with the wheels 157 and consist of a hydraulic actuator 159 which has its cylinder 161 pivotally connected to a stub shaft 162 carrying the wheel 158. The piston rod 163 of the hydraulic actuator is pivotally connected to a bracket 164 mounted on the framework 142. Means is provided for driving the wheel 158 and consists of a sprocket 166 mounted on the wheel 158 and driven by a chain 167. The chain 167 is driven by a sprocket 168 which is driven by a hydraulic motor 169. The hydraulic motor 169 is carried by the bracket 164.

A bottom wall structure 171 of the type hereinbefore described is provided as a part of the module builder. Means is provided within the framework 142 for discharging from the module builder 141 any module which has been formed in the framework 142 as hereinafter described. Such means consists of a plurality of endless chains 172 which travel upon and in box beams 173 forming a part of the bottom wall structure 171 as hereinbefore described. The chains 172 are driven by sprockets 174 mounted upon a shaft 176. The shaft 176 is rotatably mounted in pillow block bearings 177 mounted in the bottom wall structure 171.

Motive means is provided for driving the shaft 176 and consists of large sprockets 178 mounted on opposite ends of the shaft. The sprockets 178 are driven by chains 179. The chains 179 are driven by small sprockets 181 which are operated by hydraulic motors 182 mounted on platforms 183. THe platforms 87 are exterior of the framework 142 and are disposed between the reinforcing gussets 186 provided as a part of the framework as hereinbefore described. Thus it can be seen that the shaft 176 is provided with motive means for driving the shaft from opposite ends and that the endless chains 172 have their upper runs pulled as they are moving a module from the module builder.

A tamper mechanism 191 of the type hereinbefore described is mounted upon a carriage 192. The carriage 192 is provided with wheels 193 which travel upon channel members 194 of the type hereinbefore described. However, in the present embodiment of the invention, the channel members 194 extend beyond the rear of the framework 142 so that the carriage 192 and the tamper mechanism 191 carried thereby can be moved into a position so that the entire top side of the framework 142 overlying the bottom wall 171 is open. Chains 196 are provided for moving the carriage 192 from a position from the rear of the channel members 194 as shown in FIG. 11 into positions overlying the rectangular framework 142 so that the tamper mechanism 191 can be utilized in the manner hereinbefore described in previous embodiments. The tamper mechanism 191 is provided with a single blade 201 which extends across substantially the entire width of the rectangular framework 142. The blade 201 is provided with triangular shaped cutting teeth 202. The blade 201 is secured to an elongate member 203 which is generally T-shaped in cross section by suitable means such as welding. Reinforcing gussets 204 are provided on opposite sides of the blade 201 and are secured to the member 203. The T-shaped member 203 is removably secured to an elongate tube 206 by suitable means such as bolts 207. The tube 206 is secured to the tamper mechanism 191 by suitable means such as welding.

Means is provided for preventing movement of the tramper mechanism 199 to the rearmost position unless the blade 201 is in its uppermost retracted position. This means consists of vertically movable stop members 208 which are slidably mounted in sleeves 209 secured to the framework 142 by suitable means such as welding.

The stop member 208 are operated by hydraulic actuators 210 connected to ears 211 and also secured to the framework 142. These stop members can be actuated automatically by movement of the tramper mechanism over switches (not shown) to prevent the operator from accidentally attempting to move the tramper mechanism 191 rearwardly outside of the upper region of the framework 142 when the knife blade 201 is in its uppermost position.

A cab 211 is mounted on the forward extremity of the rectangular framework 142 for housing the operator for the module builder. Control levers 212 of the type hereinbefore described are provided within the cab and accessible to the operator for operating the various hydraulic motors and actuators hereinbefore described. A self-contained diesel industrial engine 216 is provided as a part of the module builder and is carried by a platform 217 mounted on the forward extremity of the rectangular framework 142 at a level which is substantially above the ground. The platform 217 also serves as a drawbar and carries a king pin 218 of the type which can be secured to a rubber-tired truck tractor for moving the module builder from one location to another. Means is provided for supporting the forward extremity of the module builder when it is not being supported by the truck tractor and consists of a pair of legs 219 which slidably extend through rectangular sleeves 221 carried by the framework 142. A pin 222 is carried by each sleeve 221 and is adapted to engage spaced apart holes 223 provided in the leg 213 so that the front extremity of the framework 142 can be supported in the desired elevated position. A ladder 224 is provided on one side of the framework for climbing up onto the platform 217 and to permit entry of the cab 211. A safety railing 226 is provided on the platform 217.

Operation and use of the module builder shown in FIGS. 11 through 13 now will be briefly described as follows. Let it be assumed that the module builder is to be utilized for compacting brush and particularly tree and vine prunings. The module builder 141 is moved to a desired location by a truck tractor. If desired, it can be detached from the truck tractor and the legs 219 utilized to support the front end of the module builder. The operator can then enter the cab by utilizing the ladder 224. The engine 216 can be started. The controls 212 are then operated to move the tramper mechanism 191 to the rearmost extremity of the module builder as shown in FIG. 11. When this is the case, the entire top side of the module builder is open to receive tree and vine trimmings. With the tramper in this out-of-the-way position trimmings of very long length as, for example, up to twelve to fourteen feet of length can be dumped into the upper side of the rectangular framework. As soon as dump as been made, the operator in the cab can then move the tramper mechanism 192 in a position which overlies the top end of the rectangular framework 142. The tramper mechanism can then be operated to move the knife blade 201 downwardly on to the brush to cut and at the same time to compact the same. The operator can advance the tramper at various increments along the length of the rectangular framework repeatedly performing this cutting and crushing operation so as to compact the module as much as possible. Since a bottom structure has been provided for the rectangular framework very substantial pressures can be applied by the tramper mechanism to cut and compact the trimmings. Repeated loads of cuttings can be dumped into the module builder and the tramper operated in the same manner as hereinbefore described until the framework 142 is filled.

Let it be assumed that sufficient prunings have been placed in the module builder 141 and compacted with the tramper 191 to provide a module of adequate size. As soon as this has been accomplished, the front extremity of the module builder is typically held in a raised position by being mounted on a truck tractor. The operator moves the tramper mechanism to a suitable out-of-the-way position as, for example, to the forward extremity of the rectangular framework 142. Thereafter, the operator can operate the controls 212 to release the latches 156 and to operate the rear door to cause the same to swing outwardly and upwardly into an uppermost out-of-the-way position. The controls can then be operated to operate the hydraulic motors 182 for driving the chains 172.

At the same time that the door 147 is opened, the friction wheel 158 is moved to frictionally engage the wheels 157 by operation of the hydraulic actuator 159. Thereafter, the operator places into operation the hydraulic motors 182 to drive the sprockets 178 which drive the chains 172 to pull the upper runs of the chains and to move the module carried by the bottom wall structure outwardly through the rear opening provided by the opening of the door 147. As this is occurring, the hydraulic motor 169 is also operated to cause rotation of the drive wheel 158. The motors 182 and the motors 169 are synchronized so that the module builder 141 is moved forwardly at the same rate of speed that the module within the module builder is moved out of the module builder 141. This co-action between the drives serve to prevent breakup of the module and also serves to prevent placing undue stress on the chains utilized for withdrawing the module from the module builder. This operation continues until the module has been completely discharged from the module builder. The module builder can then be moved forward so that the rear door 147 will clear the module. The operation of the motors 182 and the motors 169 can be stopped. Thereafter, the module builder can be pulled forwardly by the truck tractor a sufficient distance so that the rear door 147 can clear the module. Thereafter, the rear door can be closed by operation of the hydraulic actuators 152 and the latches 156. The tramper mechanism 191 can then be moved to its rearmost position after which the module builder is again ready to receive more trimmings for compacting into another module. From the foregoing it can be seen that the module builder 141 shown in FIGS. 11 through 13 is particularly efficacious for the compacting of prunings into modules. Modules measuring eighteen feet by seventeen feet in width and six feet in height can be readily made. Thus, it can be seen that the module builder can be utilized for compacting renewable resources for fuel including many farm products including tree and vineyard prunings which can be utilized in co-generation plants to generate electricity and steam. The module builder makes it possible to economically use tree and vine prunings even through they are very bulky. Typically the modules can be hauled from the field and stockpiled in a drying yard. Thereafter, after they have been dried, they can be chipped and utilized as fuel with a low moisture compact. Since the modules are relatively compact they can be handled by forklift trucks and can be loaded onto trucks or alternatively, can be actually fed directly into furnaces for combustion in energy generating plants.

The module builder is constructed in such a manner so that it can be moved down the highway for rapid transportation from one location to another. An all weather cab makes it possible to utilize the module builder in inclement weather.

What is claimed is:

1. In a module builder, a generally rectangular framework having an open top side and having spaced apart side walls and spaced apart front and rear walls, the rear wall being formed by a door movable between open and closed positions, a carriage mounted on said framework for movement longitudinally of the framework between the front and rear walls, a tramper mechanism carried by the carriage and having a tramper mechanism carried by the carriage and having a tramper foot, means for moving said tramper foot vertically within said framework for forming a module from material which is dumped into the framework, and wheels mounted on opposite sides of said framework to permit said module builder to be transported from one location to another, said side walls having upwardly and outwardly flared portions so that imaginary vertical lines depending from the outer upper margins of the side walls clear the outer margins of the wheels on the sides of the rectangular framework.

2. In a module builder, a generally rectangular framework having an open top side and having spaced apart side walls and spaced apart front and rear walls, the rear wall being formed by a door movable between open and closed positions, a carriage mounted on said framework for movement longitudinally of the framework between the front and rear walls, means for causing movement of said carriage between the front and rear walls, a tramper mechanism carried by the carriage and having a tramper foot, means for moving said tramper foot vertically within said framework for forming a module from material which is dumped into the framework, wheel means mounted on opposite sides of said framework to permit said module builder to be transported from one location to another, said side walls having upwardly and outwardly flared portions so that imaginary vertical lines depending from the outer margins of the side walls clear the wheel means on the sides of the rectangular framework, rake means carried by the carriage and extending transversely of the rectangular framework, said rake means including rake teeth movable between a material engaging position in which the rake teeth are in a substantially vertical position and an out-of-the-way position in which the rake teeth are in a substantially horizontal position and means for moving said rake means between said material engaging and out-of-the-way positions.

3. A module builder as in claim 2 wherein said rake teeth are generally L-shaped.

4. A module builder as in claim 1 together with an attachment secured to said tramper foot and extending transversely of the rectangular framework, said attachment having a dimension extending longitudinally of the framework which is a small fraction of the longitudinal dimension of the framework.

5. A module builder as in claim 4 wherein said attachment comprises a plate providing a surface which is concave in a direction which is transverse to the rectangular framework.

6. A module builder as in claim 4 wherein said attachment is in the form of a flat plate secured to the tramper foot and a knife blade secured to the flat plate and extending transversely of the rectangular framework and depending in a vertical direction from the plate.

7. A module builder as in claim 4 wherein said attachment comprises a flat plate adapted to be secured to the tramper foot, a knife blade secured to the flat plate and extending transversely of the rectangular framework and a plurality of additional knife blades secured to the plate and depending vertically from the flat plate and extending in direction sat right angles to the first named knife blade.

8. A module builder as in claim 7 wherein said additional knife blades are disposed on opposite sides of the first named knife blade.

9. A module builder as in claim 1 together with a bottom wall structure enclosing the bottom wall of said rectangular framework and means carried by the bottom wall for moving a module formed therein through the rear of the module builder when the door is moved to an open position.

10. In a module builder, a generally rectangular framework having an open top side and having spaced apart side walls and spaced apart front and rear walls, the rear wall being formed by a door movable between open and closed positions, a carriage mounted on said framework for movement longitudinally of the framework between the front and rear walls, means carried by the framework for causing movement of said carriage between the front and rear walls, a tramper mechanism carried by the carriage and having a tramper, means for moving said tramper vertically within said framework for forming a module from material deposited within the framework, rake means carried by the carriage and movable between material engaging and out-of-the-way positions, said rake means including a plurality of teeth spaced transversely of the rectangular framework and when in the material engaging position being disposed vertically and means for moving said rake means between the material engaging and out-of-the-way positions.

11. In a module builder, a generally rectangular framework having an open top side and having spaced apart side walls and spaced apart front and rear walls, the rear wall being formed by a door movable between open and closed positions, a carriage mounted on said framework for movement longitudinally of the framework between the front and rear walls, means carried by the framework for causing movement of said carriage between the front and rear walls, a tramper mechanism carried by the carriage and having a tramper mechanism carried by the carriage and having a tramper foot extending transversely of the framework, means for moving said tramper foot vertically within said framework for compacting material placed within the framework to form a module, and an attachment removably secured to the tramper foot for performing operations upon the material placed within the module builder, said attachment having a dimension extending longitudinally of the framework which is a small fraction of the longitudinal dimension of the framework.

12. A module builder as in claim 11 wherein said attachment comprises a plate secured to said tramper foot and having a concave curvature in a direction which extends transversely of the rectangular framework.

13. A module builder as in claim 11 wherein said attachment comprises a knife blade carried by the tramper foot and depending vertically therefrom and extending transversely of the rectangular framework.

14. A module builder as in claim 11 wherein said attachment comprises a knife blade carried by the tramper foot so that it depends from the tramper foot and extends transversely of the rectangular framework and additional knife blades carried by the tramper foot and being spaced apart and disposed on opposite sides of said first named knife blade and extending in directions longitudinal of the rectangular framework.

15. In a module builder, a generally rectangular framework having an open top side and having spaced apart side walls and spaced apart front and rear walls, the rear wall being formed by a door movable between open and closed positions, track means carried by the framework and extending beyond a rear extremity of the rectangular framework, a carriage mounted on said framework for movement longitudinally of the framework between the front wall and a position to the rear of the rear wall, means for causing movement of said carriage and a tramper mechanism carried by the carriage and having a tramper foot, said tramper mechanism including means for moving said tramper foot vertically within said framework for forming a module from material which is dumped into the framework and means for preventing movement of said tramper mechanism to a position to the rear extremity of the rectangular framework unless the tramper foot is moved to a raised position.

16. A module builder as in claim 15 wherein said means for preventing movement of said tramper mechanism beyond the rear extremity of the framework unless the tramper foot is in a raised position includes a hydraulic actuator which assumes a blocking position when the tramper foot is not in a raised position.

17. In a module builder, a generally rectangular framework having an open top side and having spaced apart side walls and spaced apart front and rear walls, the rear wall being formed by a door movable between open and closed positions, track means carried by the framework and extending beyond a rear extremity of the rectangular framework, a carriage mounted on said framework for movement longitudinally of the framework between the front wall and a position to the rear of the rear wall, means for causing movement of said carriage and a tramper mechanism carried by the carriage and having a tramper foot, said tramper mechanism including means for moving said tramper foot vertically within said framework for forming a module from material which is dumped into the framework, said tramper foot being in the form of a single blade extending substantially the entire width of the module builder.

18. In a module builder, a generally rectangular framework having an open top side and having spaced apart side walls and spaced apart front and rear walls, the rear wall being formed by a door movable between open and closed positions, track means carried by the framework and extending beyond a rear extremity of the rectangular framework, a carriage mounted on said framework for movement longitudinally of the framework between the front wall and a position to the rear of the rear wall, means for causing movement of said carriage and a tramper mechanism carried by the carriage and having a tramper foot, said tramper mechanism including means for moving said tramper foot vertically within said framework for forming a module from material which is dumped into the framework, said rectangular framework including a bottom wall structure, chains having upper runs carried by the bottom wall structure and means for operating said chains so that the upper runs of the chains are pulled from the rear of the module builder for unloading a module from the module builder.

19. A module builder as in claim 18 together with wheels mounted on opposite sides of the framework to permit the module builder to be transported from one location to another and means synchronized with the means for driving said chains for causing the module builder to be advanced at substantially the same rate of speed as the module is withdrawn from the module builder.

20. A module builder as in claim 18 wherein the means for driving the chains includes a hydraulic motor disposed on each side of the module builder, a common shaft driven by the hydraulic motors and sprockets carried by the common shaft for driving said chains.

21. In a module builder, a generally rectangular framework having an open top side and having spaced apart side walls and spaced apart front and rear walls, the rear wall being formed by a door movable between open and closed positions, track means carried by the framework and extending beyond a rear extremity of the rectangular framework, a carriage mounted on said framework for movement longitudinally of the framework between the front wall and a position to the rear of the rear wall, means for causing movement of said carriage and a tramper mechanism carried by the carriage and having a tramper foot, said tramper mechanism including means for moving said tramper foot vertically within said framework for forming a module from material which is dumped into the framework, said rectangular framework including a bottom wall structure, chains having upper runs carried by the bottom wall structure, means for operating said chains so that the upper runs of the chains are pulled from the rear of the module builder for unloading a module from the module builder, wheels mounted on opposite sides of the framework to permit the module builder to be transported from one location to another and means synchronized with the means for driving said chains for causing the module builder to be advanced at substantially the same rate of speed as the module is withdrawn from the module builder, said means for advancing the module builder including means for frictionally engaging the wheels of the module builder.

22. In a module builder, a generally rectangular framework having an open top side and having spaced apart side walls and spaced apart front and rear walls, the rear wall being formed by a door movable between open and closed positions, track means carried by the framework and extending beyond a rear extremity of the rectangular framework, a carriage mounted on said framework for movement longitudinally of the framework between the front wall and a position to the rear of the rear wall, means for causing movement of said carriage and a tramper mechanism carried by the carriage and having a tramper foot, said tramper mechanism including means for moving said tramper foot vertically within said framework for forming a module from material which is dumped into the framework, said rectangular framework including a bottom wall structure, chains having upper runs carried by the bottom wall structure, means for operating said chains so that the upper runs of the chains are pulled from the rear of the module builder for unloading a module from the module builder, wheels mounted on opposite sides of the framework to permit the module builder to be transported from one location to another and means synchronized with the means for driving said chains for causing the module builder to be advanced at substantially the same rate of speed as the module is withdrawn from the module builder, said means for engaging the wheels of the module builder including a friction wheel engaging the wheels and a hydraulic motor driving said friction wheel.

23. In a module builder, a generally rectangular framework having an open top side and having spaced apart side walls and spaced apart front and rear walls, the rear wall being formed by a door movable between open and closed positions, a carriage mounted on said framework for movement longitudinally of the framework, means for causing movement of said carriage, a tramper mechanism carried by the carriage and having a tramper foot, said tramper mechanism including means for moving said tramper foot vertically within said framework for forming a module from material which is dumped into the framework, wheels mounted on opposite sides of said framework to permit said module builder to be transported from one location to another, said framework including a bottom wall structure, means carried by the bottom wall structure including chains having upper runs engaging a module in the module builder for withdrawing the module from the module builder , means for causing operation of the chains including sprockets engaging the chains, a shaft carrying the sprockets and motive means for driving the shaft whereby when the motive means is placed in operation, a pulling force is applied to the upper runs of the chains to cause the chains to move with respect to the rectangular framework, and means synchronized with the operation of said chains and engaging said wheels for driving said wheels of the module builder to cause the module builder to be advanced at approximately the same rate of speed that the module is withdrawn from the module builder, said means for engaging the wheels of the module builder including a friction wheel and means for driving the friction wheel in synchronism with the driving of the shaft for the chains.

* * * * *